US011363906B2

(12) United States Patent
Fontier et al.

(10) Patent No.: US 11,363,906 B2
(45) Date of Patent: Jun. 21, 2022

(54) TRAVEL COFFEE KIT

(71) Applicants: Malcolm Fontier, Brooklyn, NY (US);
Gareth Brown, Gardiner, NY (US);
Stephen Kaes, Brooklyn, NY (US);
Matthew Chin, New York, NY (US)

(72) Inventors: Malcolm Fontier, Brooklyn, NY (US);
Gareth Brown, Gardiner, NY (US);
Stephen Kaes, Brooklyn, NY (US);
Matthew Chin, New York, NY (US)

( * ) Notice: Subject to any disclaimer, the term of this patent is extended or adjusted under 35 U.S.C. 154(b) by 479 days.

(21) Appl. No.: 16/457,609

(22) Filed: Jun. 28, 2019

(65) Prior Publication Data

US 2020/0008604 A1  Jan. 9, 2020

Related U.S. Application Data

(60) Provisional application No. 62/694,674, filed on Jul. 6, 2018.

(51) Int. Cl.
*A47J 31/00* (2006.01)
*A47J 31/54* (2006.01)
*A47J 31/02* (2006.01)
*A47G 19/22* (2006.01)

(52) U.S. Cl.
CPC ........ *A47J 31/005* (2013.01); *A47G 19/2272* (2013.01); *A47J 31/02* (2013.01); *A47J 31/54* (2013.01)

(58) Field of Classification Search
CPC .......... A47J 31/005; A47J 31/02; A47J 31/54; A47G 19/2272
See application file for complete search history.

(56) References Cited

U.S. PATENT DOCUMENTS

| | | | | |
|---|---|---|---|---|
| 692,761 | A * | 2/1902 | Bickel | A47J 31/20 137/533.13 |
| 2,583,335 | A * | 1/1952 | Jepson | A47J 43/284 210/534 |
| D833,794 | S | 11/2018 | Cuffaro | |
| 2016/0029831 | A1 | 2/2016 | Beckman et al. | |
| 2019/0387916 | A1* | 12/2019 | Tempelis | A47J 31/20 |

* cited by examiner

*Primary Examiner* — Omar Flores Sanchez

(57) ABSTRACT

A compact, lightweight coffee-making kit designed for use in travel includes a kettle for boiling water; an electric power base; a drinking cup with a removable lid; a pour-over-style funnel filter support; a container for coffee beans or grounds; and a carrying case. All the components are sized to stack into each other to form a composite kit that fits into a carrying case.

9 Claims, 17 Drawing Sheets

100

112

112

112

112

212

TRAVEL COFFEE KIT

This application claims the priority date of provisional patent application 62/694,674 filed 2018 Jul. 6.

TECHNICAL FIELD

The present disclosure relates to portable or compact beverage-making apparatuses, e.g., for traveling; kitchen equipment, coffee mills, spice mills and apparatuses for making beverages. It relates more particularly to portable, electric, coffee-making apparatuses.

BACKGROUND

Portable coffee-brewing methods and apparatuses are used for camping and traveling. They are designed to be small and lightweight, with components usually comprising coffee-storage containers; drinking cups; brewing vessels; and a type of filter support through which hot water is poured. Components are sized to stack or fit within each other so that they may be stored in luggage or backpacks.

SUMMARY

The present embodiment relates to a compact, lightweight coffee-making kit designed for use in travel. It includes a kettle for boiling water; an electric power base; a drinking cup with a removable lid; a pour-over-style funnel-shaped brewing filter support; a container for coffee beans or grounds; and a carrying case. All the components are sized to stack into each other to form a composite kit that fits in a carrying case.

The embodiment's kettle employs a formed, slender, pouring conduit that originates at the depth of the kettle and terminates in a spout at the upper portion of the kettle. This conduit's length and orientation allow liquid to pour more evenly than from a shallower conduit or from a spout without a conduit. The area of the spout opening relative to the length and diameter of the conduit, as well as the diameter of the flow-control aperture, contribute to even pouring. A full volume of liquid in the kettle produces pressure against the flow hole for steady, outward flow. The conduit and spout project minimally from the kettle to maintain a compact kettle profile. The kettle is a cylindrical form of a material able to withstand the heat of boiling water without deforming, dissolving or off-gassing into the water. It has a preferably silicone exterior sheath which is debossed for manipulation. A lid has a silicone gasket and a center knob for gripping.

A coffee canister is formed, in some embodiments, of stainless steel with an insulating outer sheathing and a press-fit lid. The container is of a size and shape to fit into the kit. Substantially flexible and deformable forms and details are formed in some embodiments of a castable elastomer such as silicone, and on one embodiment an elastomer sheath holds it snugly when stacked into the other components of the kit for storage. In one embodiment the coffee canister is configured to fit into a drinking cup. The drinking cup has a cover with an opening for sipping which substantially covers the cup's drinking opening so as to prevent spilling. A tab is sized to fit in the cup's drinking opening when packed, providing a secondary containment that prevents coffee grounds from spilling during travel. This tab facilitates removal when unpacking the container and other parts from their stacked places in the kit.

A drinking cup is formed of double-walled dense material that can withstand the heat of boiling water without deforming, dissolving or off-gassing into hot water. In one embodiment the cup is stainless steel, or of stainless steel with a ceramic coating on its inner and outer layers; or of ceramic. An insulating outer sheathing provides a comfort grip and a snug fit within other components in the kit. The cup has a lid with a castable-elastomer gasket to hold it in place and to provide an opening for sipping the beverage. The opening is sized so that it can be hooked with a finger and removed.

A collapsible, funnel-shaped filter support uses a ball-and-detent to hold it in a fixed, expanded position. An annular base supports the funnel and rests atop the drinking cup. A ring gasket seals any gap between the bottom of the filter support cone and its base. The filter support is sized to fit, when collapsed, into the top of the kettle during storage.

A lighted switch, located on the kettle's base, is set in a gap that prevents accidental activation. In use, the kettle is placed on an electric-power base which actuates a heater in the kettle to heat the water.

BRIEF DESCRIPTION OF THE DRAWINGS

To assist those of skill in the art of making and using the disclosed embodiment, reference is made to the accompanying figures, wherein.

DETAILED DESCRIPTION

Figure 1:
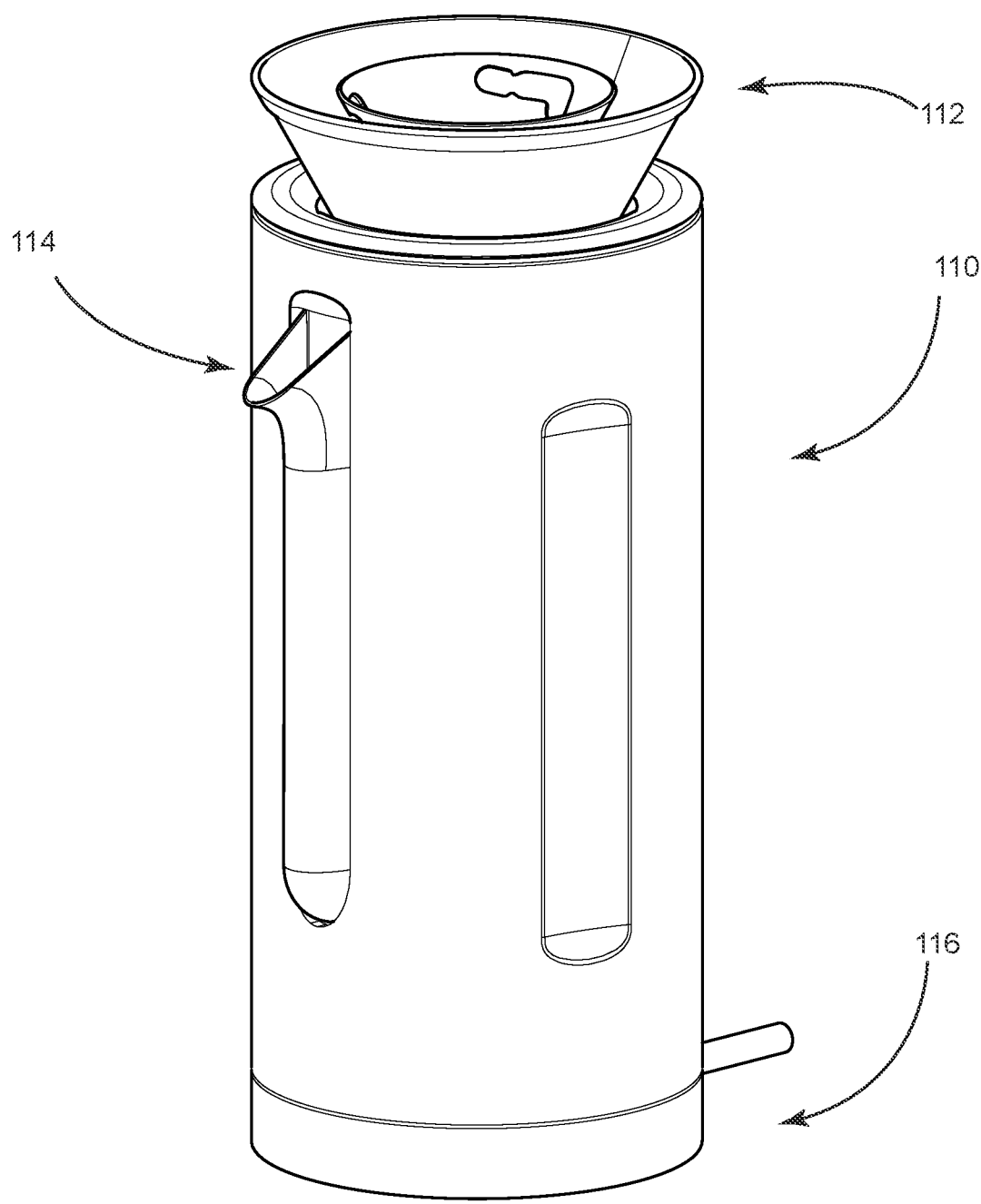
FIG. 1 is a side perspective view of the embodiment in its assembled state.

In FIG. 1 an example embodiment 100 is shown in assembled state in a side, perspective view, illustrating an electric kettle 110, its pour-spout 114, heater base 116, and funnel filter support 112, which is collapsed and stored atop the kettle 110.

Figure 2:
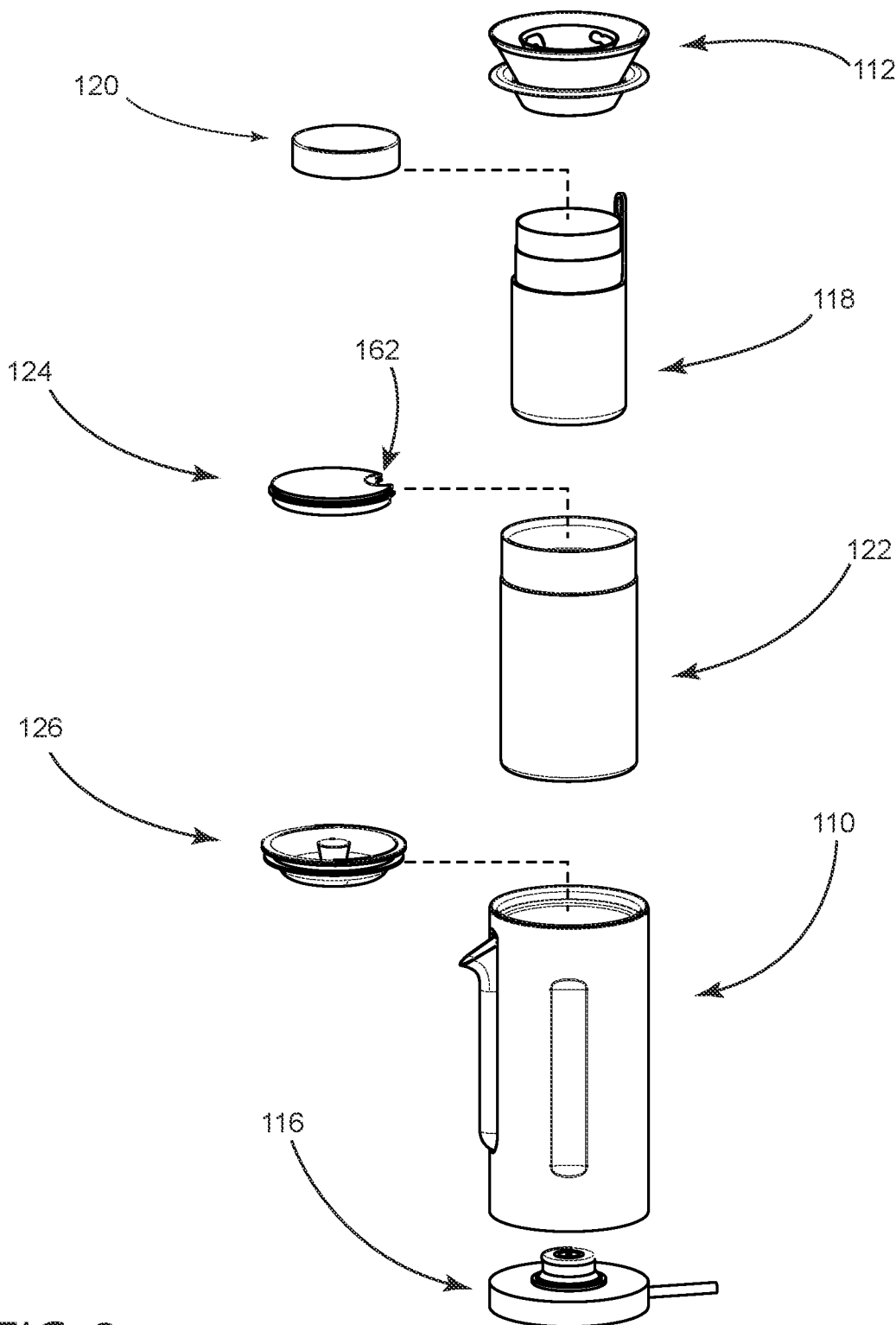
FIG. 2 is an exploded view of the embodiment.

In FIG. 2, an exploded view of the embodiment 100 shows the sub-assemblies that comprise the travel coffee kit. A coffee canister 118 fits inside a drinking cup 122 which fits inside the electric kettle 110. When packed the drinking cup's lid 124 conceals the coffee canister 118. It can be removed by hooking a finger into a drinking aperture 162, revealing the coffee canister packed beneath. At the top of the assembled kit, a funnel filter support 112 fits collapsed on the lid of the kettle 110. When packed, a heater base with electrical cord 116 fits proximal to the assembly in the case.

Figure 3:
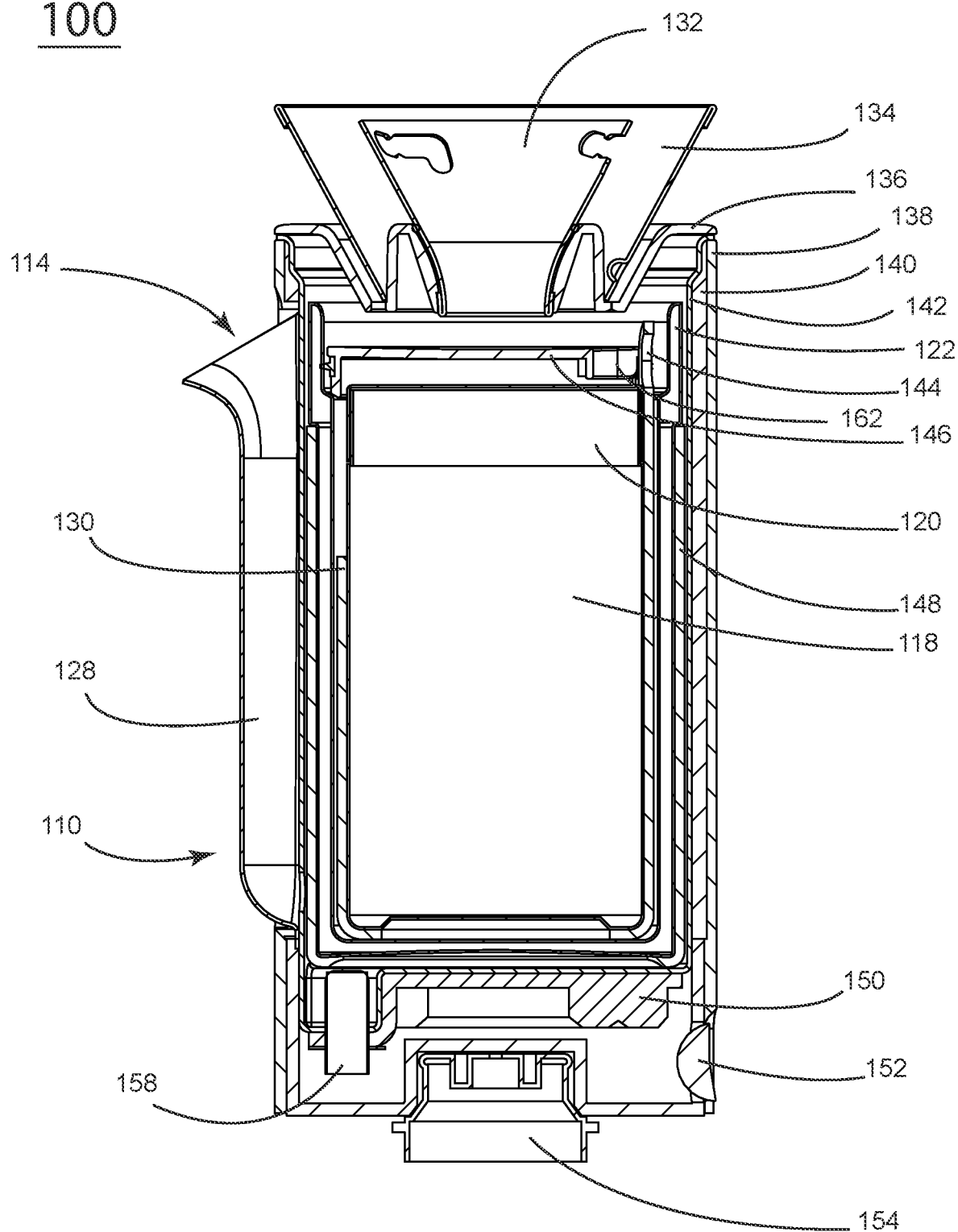
FIG. 3 is a cross-section view of the embodiment.

In FIG. 3 a cross-section view of the embodiment 100 shows the inner part of the funnel filter support 132, outer part 134, and base 136.

A tab 144 on the canister is for pulling the stacked cup 122 and canister 118 out of the kettle 110 during unpacking.

In its packed state the innermost object is the canister 118 with lid 120. The canister has an insulating sheath of castable elastomer 130 that damps movement of the canister within the cup 122. The canister is stacked into the drinking cup 122 which has an insulative, elastomeric cover 148. The cup's lid 146 has a drinking opening 162 through which the canister's pull tab 144 fits through and can be reached to pull the stacked canister and cup out of the ensemble.

The kettle 110 consists of an inner vessel 142 which is fixedly engaged with a pouring conduit 128 that has a flow-control aperture originating at the depth of the kettle (FIG. 11, 196) and a flow-control pour-spout 114 (FIG. 3) at the top end.

The outermost layer of the kettle 110 is a castable-elastomer sheath 138.

The kettle's electronic parts include a thermistor 158, heating coil 150, switch 152; and male and female Strix connectors 154.

Figure 4:
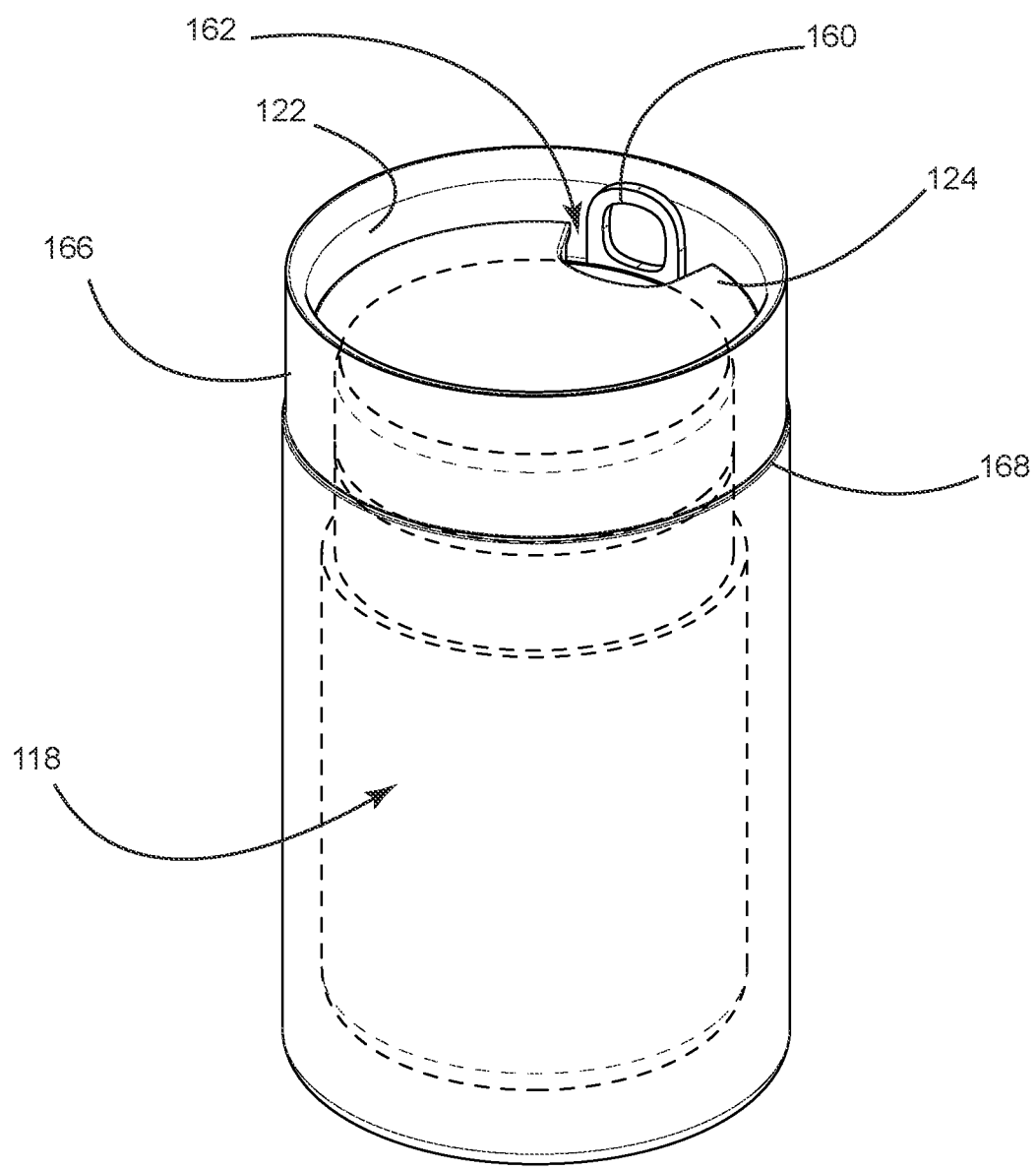
FIG. 4 is a perspective view of the coffee canister and drinking cup.

In FIG. 4 the coffee canister (dotted line) 118, drinking cup 122 and lid 124 are shown packed. The canister 118 is sheathed by a castable elastomer to prevent rattling against the inner surface of the cup 122. The tab 160 of the coffee canister protrudes from the drinking-cup's drinking aperture 162. The drinking cup 122 has a silicone insulating outer sheath 168. In various embodiments, the cup's inner cylinder 166 is made of stainless steel, ceramic, or ceramic-coated stainless steel. Those skilled in the art understand the various materials used for hot-drink cups.

Figure 5:
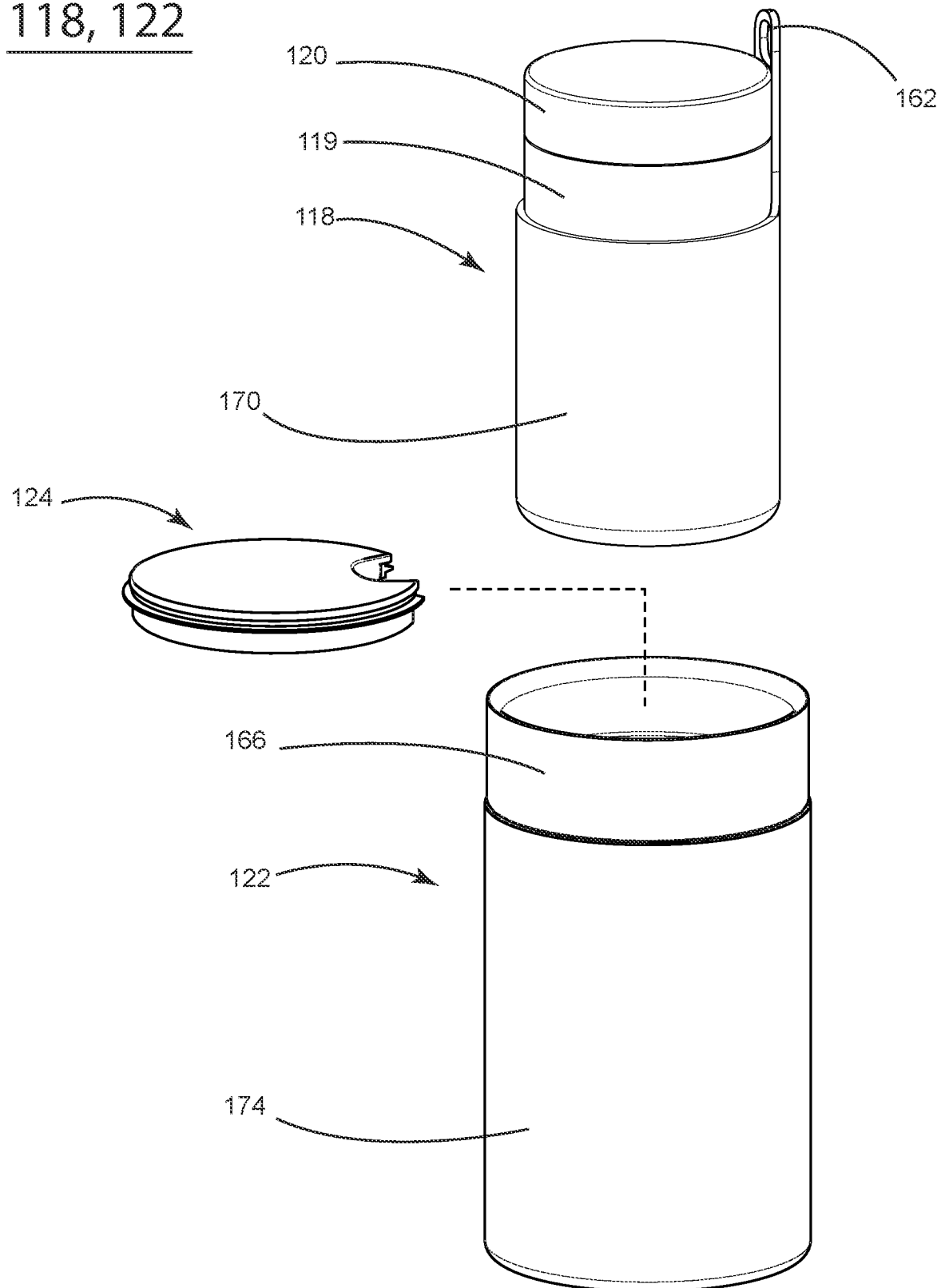
FIG. 5 is a partially exploded view of the coffee canister and drinking cup.

FIGS. 5, 118 and 122 shows the coffee canister 118 removed from the drinking cup 122. The coffee canister 118 comprises a container 119 that has a friction-fit lid 120. In some embodiments, the inner container 119 and lid 120 are of a single-walled stainless construction. The canister has a castable-elastomer outer sheathing 170. The tab 162 is integral to the canister's castable-elastomer outer sheathing 170. The drinking cup 122 is comprised of a vessel 166 with a padded outer surface 174 and a snap-fit lid 124. In some embodiments the vessel 166 is made of stainless steel with a ceramic coating. In some embodiments the padded outer surface 174 is made of a castable elastomer such as silicone.

Figure 6:
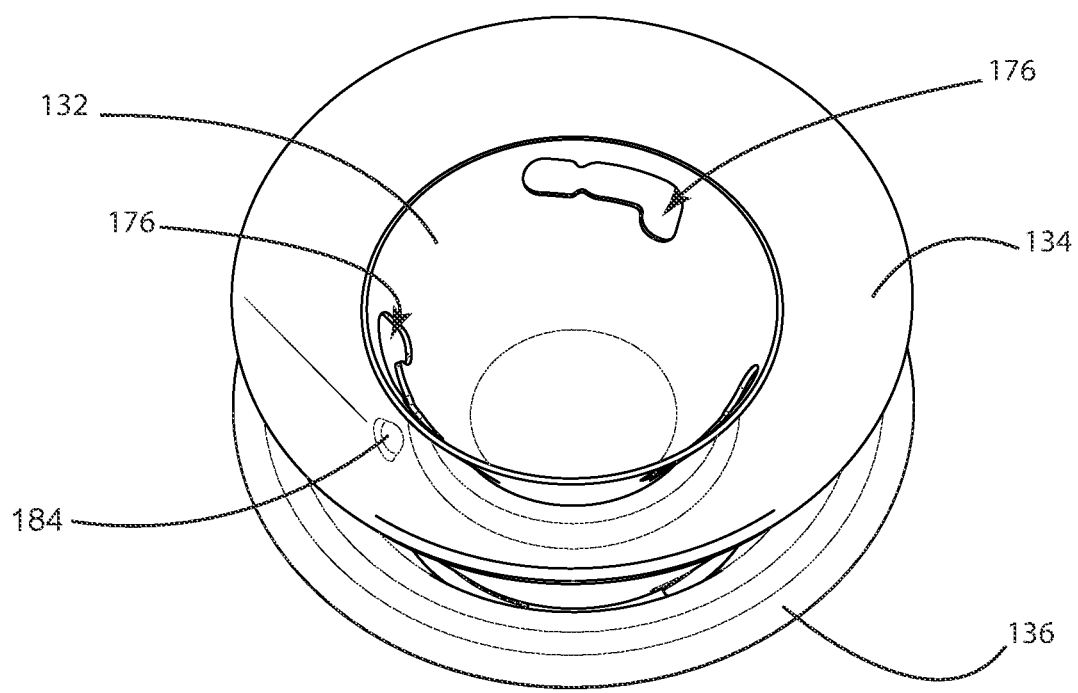
FIG. 6 is a detailed view of the funnel filter support shown collapsed for storage.

In FIG. 6 the funnel filter support 112 is shown in a top perspective view, collapsed. The funnel comprises two parts, a lower portion 132 and an upper portion 134, both of which engage with a ball-and-detent mechanism. The "ball" of this mechanism is one or more spherical protrusions 184 (one is shown) that protrude from the inner wall of the upper portion of the funnel 134. These slide into the matching detents 176 in of the lower portion 132. To extend the funnel filter support from its collapsed position, the upper portion 134 is manually pulled up and rotated, activating the locking mechanism.

Figure 7:
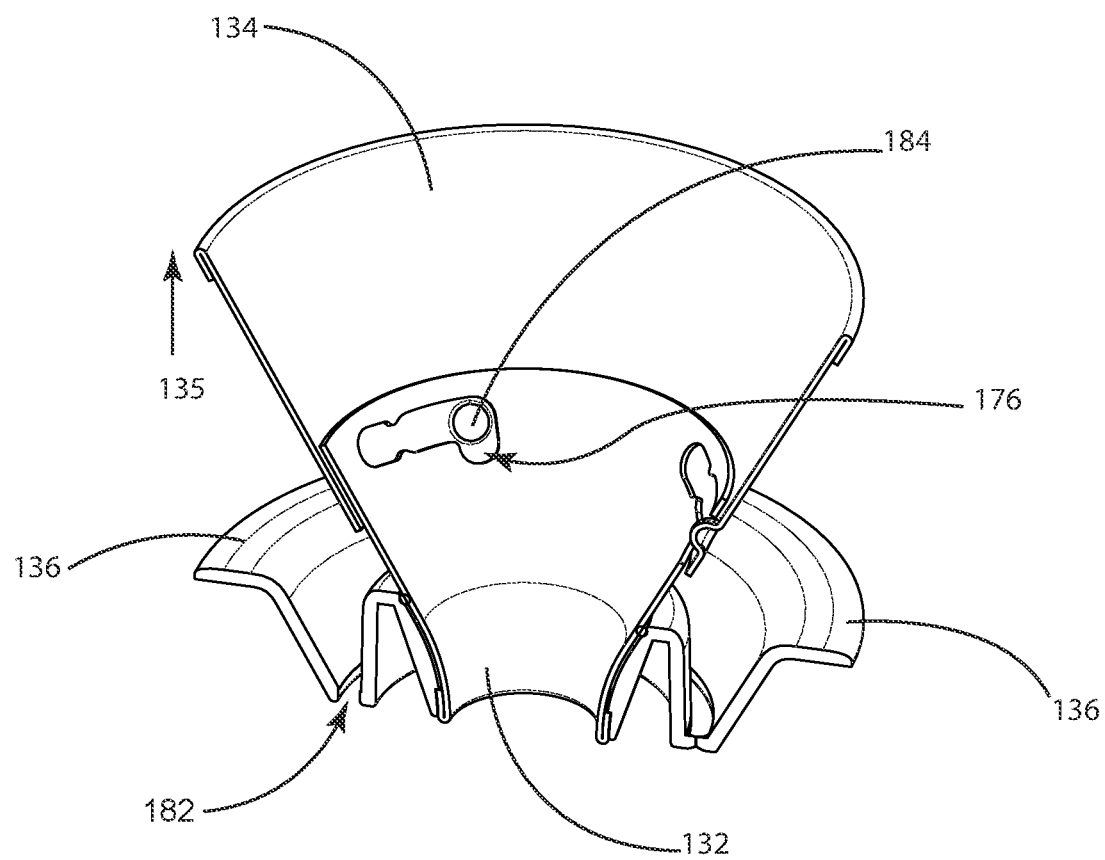
FIG. 7 is a cross-section view of the funnel filter support shown expanded.
Figure 9:
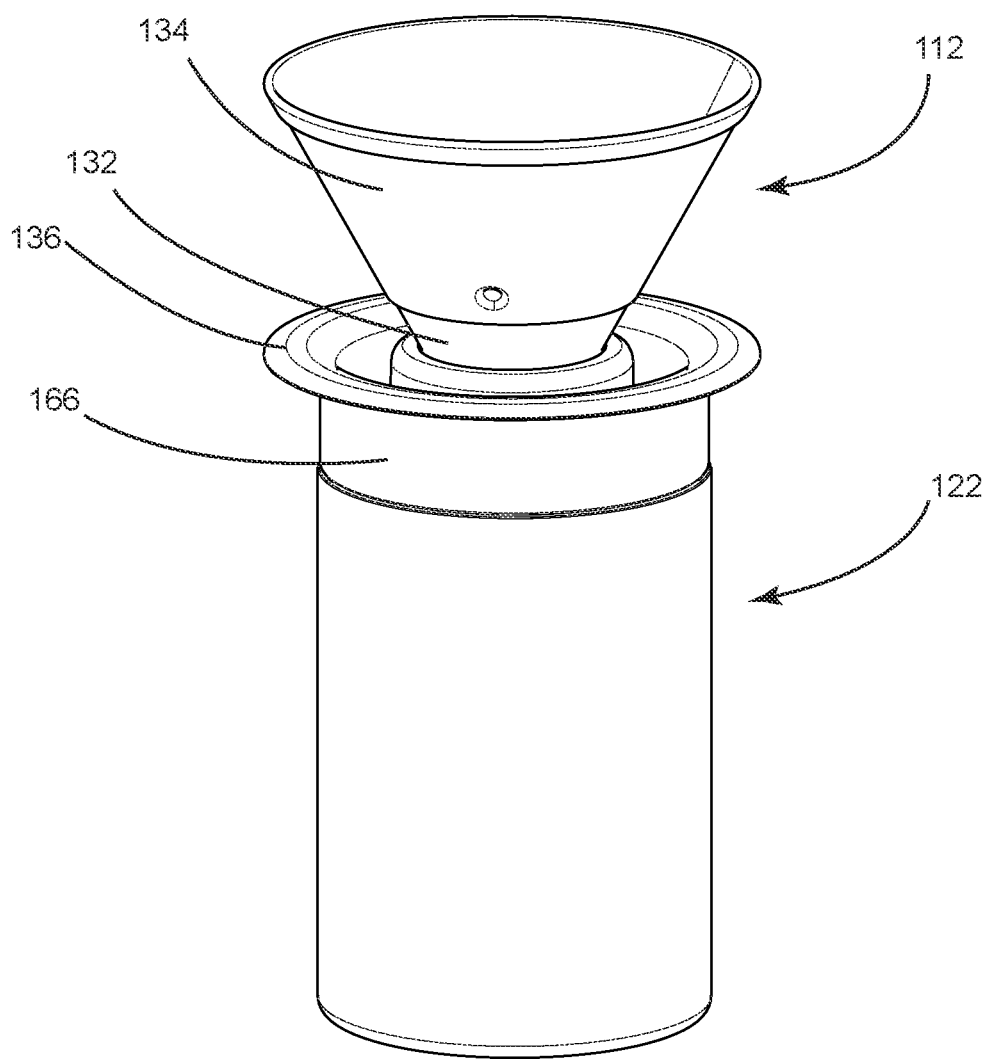
FIG. 9 is a perspective view of the funnel filter support fully expanded and installed atop the drinking cup and ready for use.

In FIG. 7 the funnel filter support 112 is shown expanded and ready for use. The ball-and-detent mechanism 176 allows the upper section 134 to be pulled up axially from the lower section 132 (arrow 135) then rotated and locked open. With the rotation of the outer funnel section 134, the ball 184 slides into the aperture 176 and locks into place. The base 136 is designed to fit over the drinking cup 122 (FIG. 9). Drainage holes 182 (FIG. 7) allow liquid that may spill over the funnel 112 to drain into the cup 122 (FIG. 9).

Figure 8:
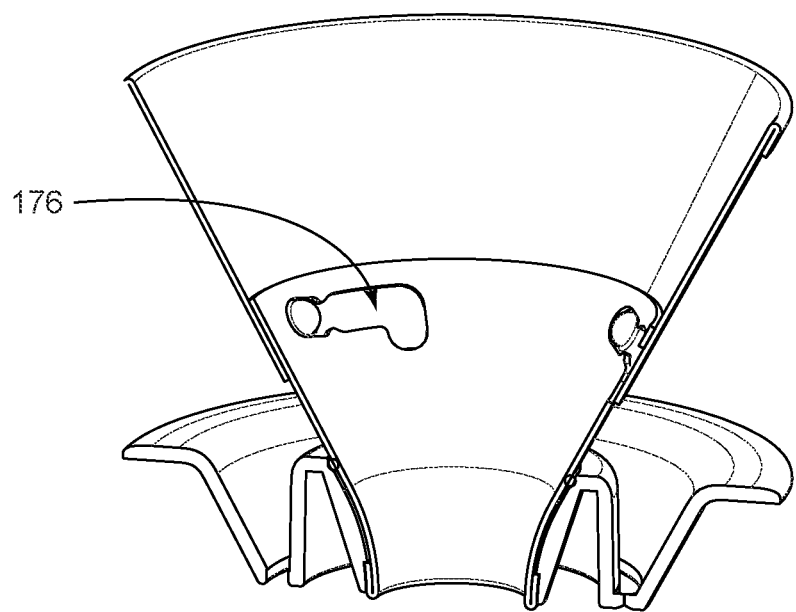
FIG. 8 is a cross-section view of the funnel filter support expanded and locked open.

In FIG. 8 the collapsible funnel filter support 112 is shown expanded, with the ball in the ball-and-detent mechanism 176 unlocked. In this position the funnel may be collapsed axially for storage.

In FIG. 9, the funnel filter support 112 is placed in its expanded, locked state atop the drinking cup 122, ready for brewing coffee. The inner 132 and outer funnels 134 are locked in place and the base 136 rests on the top of the inner portion 166 of the cup 122.

Figure 10:
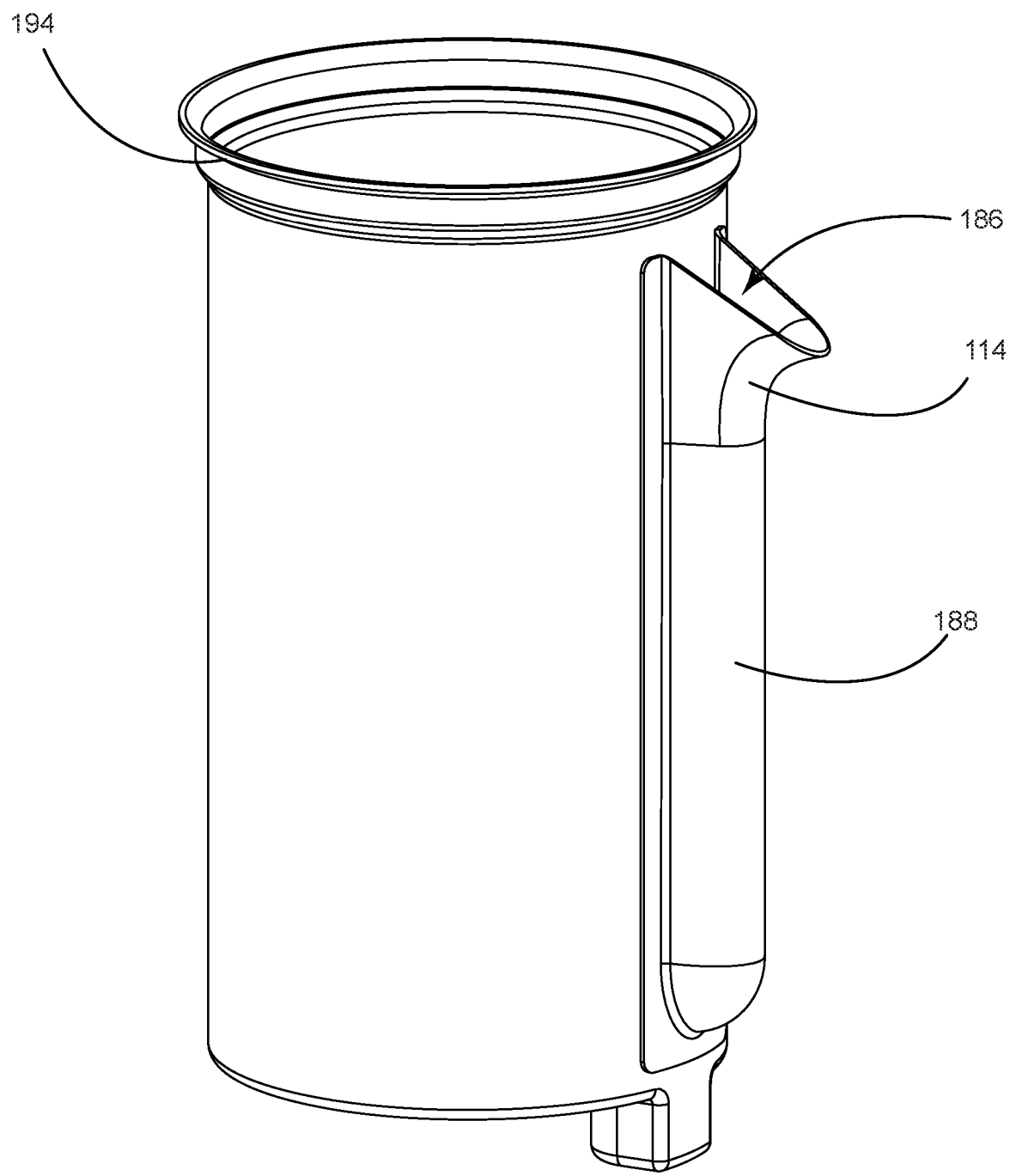
FIG. 10 is a perspective view of the inner vessel of the kettle.
Figure 11:
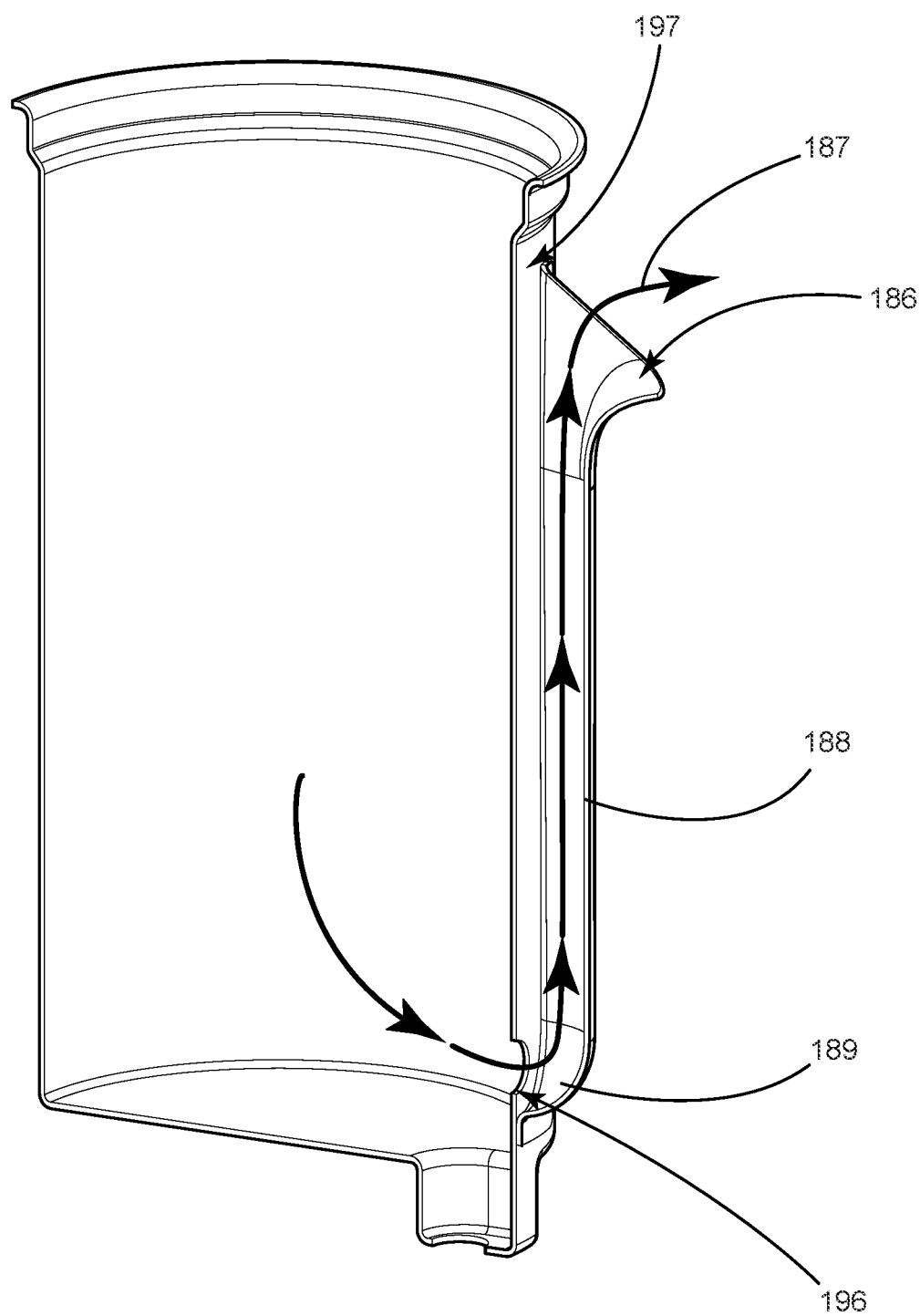
FIG. 11 is perspective, section view showing the flow of liquid through the inner vessel of the kettle.

FIGS. 10 and 11 depict the inner vessel 142 of the kettle with its integral conduit 188 and pour-spout 114. The angle of the spout opening 186, as well as the proximity of the spout to the inner vessel 142, contribute to even pouring of a steady stream of liquid over coffee grounds in the funnel 112 (FIG. 9). The area of the spout opening 186, relative to the length and diameter of the conduit 188 and the diameter of the flow-control aperture 186, cause liquid to flow in an even, steady stream. The volume of liquid in the kettle produces pressure against the flow hole 196 (FIG. 11) resulting in increased pressure through a relatively small hole 196 that expands in the conduit 188 thus slowing the flow velocity, resulting in a steady outward flow through the spout 186. The top rim 194 (FIG. 10) of the kettle fits a lid (FIG. 2, 126) and is flared to overlap the insulation layers.

FIG. 11 is perspective, section view of the main vessel 142 of the kettle showing the flow of liquid 187 through the flow-control aperture 196 through a 90-degree elbow 189 up the conduit 188 and out of the spout opening 186. The relative size of the aperture 196 in relation to the cross-sectional area of the conduit 188 provides a flow rate of between 22-25 ml/second. The conduit is formed in part by the portion of the outer surface 197 of the vessel 142. Specifically, the portion of the outer surface 197 that is in fluid communication with the flow path 187 forms a portion of the inner walls of the conduit 188 through which the fluid flows along the flow path 187 at a rate of 22-25 ml/second.

Figure 12:
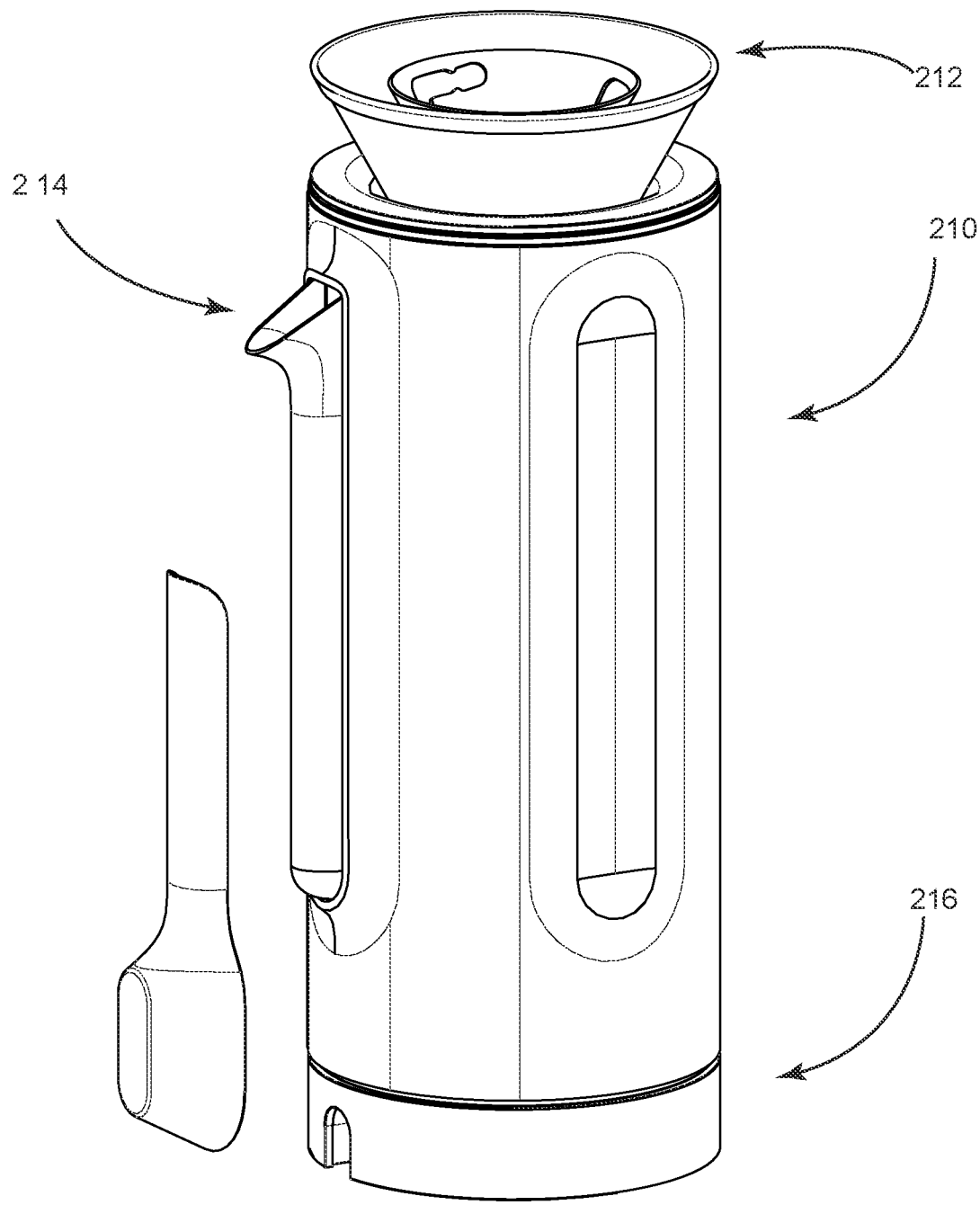
FIG. 12 is perspective view of a second iteration of the embodiment.

FIG. 12 shows example embodiment 200 in assembled state in a side, perspective view, illustrating an electric kettle 210, its pour-spout 214, heater base 216 and funnel filter support 212, which is collapsed and stored atop the kettle 210.

Figure 13:
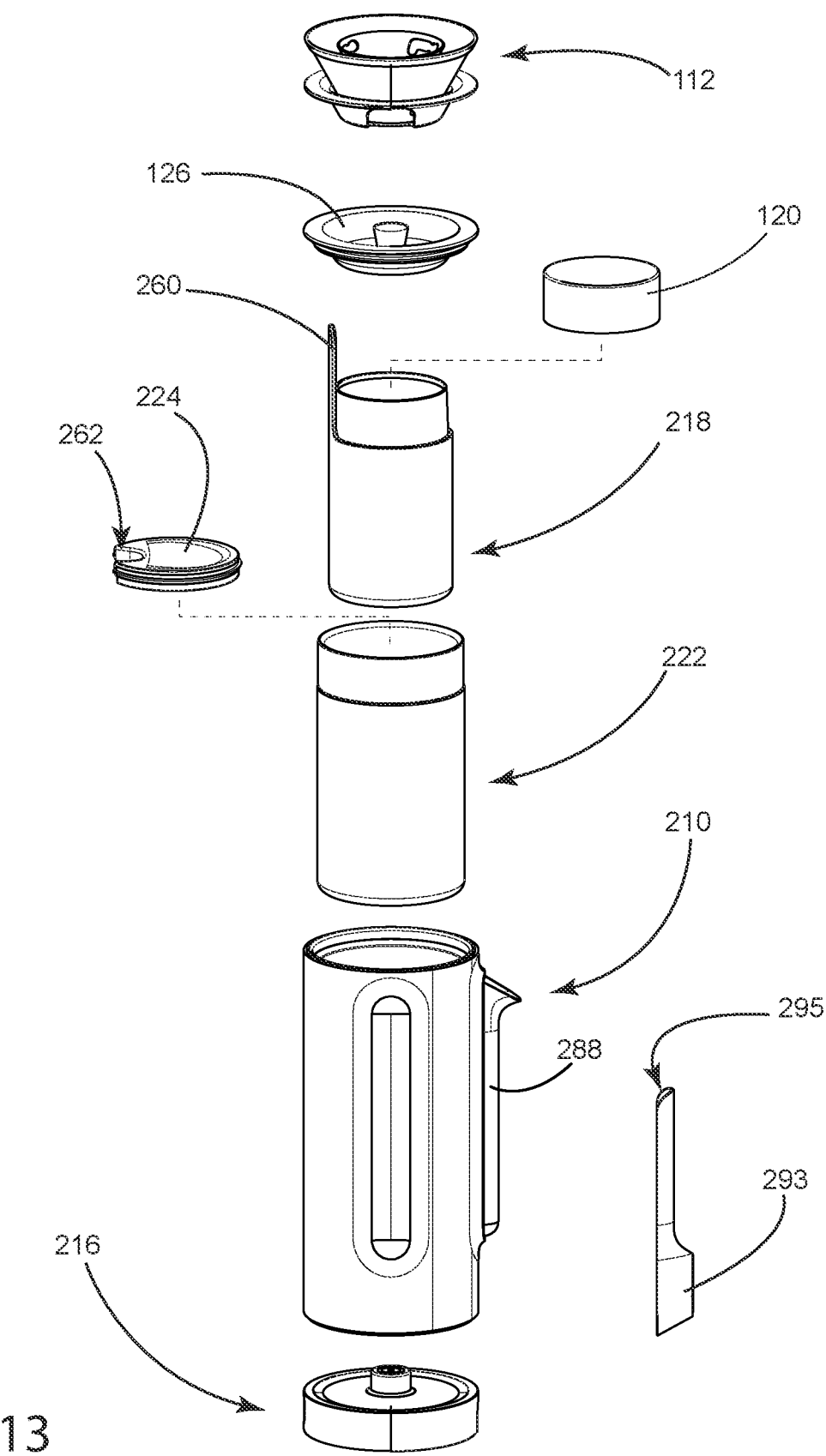
FIG. 13 is an exploded view of a second iteration of the embodiment.

In FIG. 13 an exploded view of embodiment 200 shows the sub-assemblies that comprise the travel coffee kit. A coffee canister 218 fits inside a drinking cup 222 which fits inside the electric kettle 210. When packed the drinking cup's lid 224 conceals the coffee canister 218. It can be removed by hooking a finger into a drinking aperture 262, revealing the coffee canister packed beneath. The tab 260 passes through the aperture 262 in the lid 224 for removing the canister 218. At the top of the assembled kit, a funnel filter support 212 fits collapsed on the lid of the kettle 210. A coffee scoop 293 is configured with a channel 295 in the handle that mates with the conduit 288.

Figure 14:
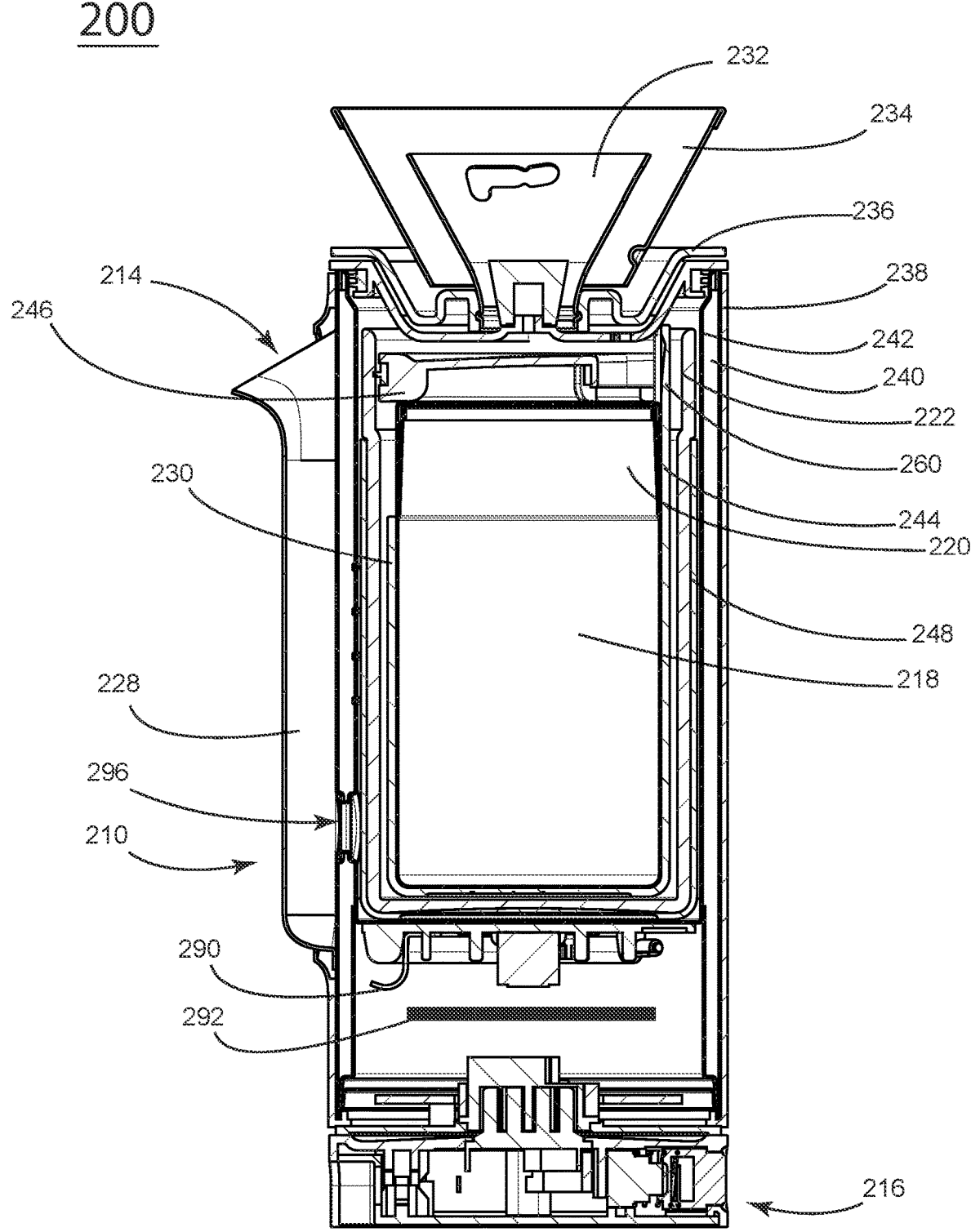
FIG. 14 is a cross-section view of this iteration

In FIG. 14 a cross-section view of the embodiment 200 shows the inner part of the funnel filter support 232, outer part 234, and base 236. A tab 244 on the canister is for pulling the stacked cup 222 and canister 218 out of the kettle 210 during unpacking. In its packed state the innermost object is the canister 218 with lid 220. The canister has an insulating sheath of castable elastomer 230 that damps movement of the canister within the cup 222. The canister is stacked into the drinking cup 222 which has an insulating, elastomeric cover 248. The cup's lid 146 has a drinking opening 262 through which the canister's pull tab 244 fits through and can be reached to pull the stacked canister and cup out of the ensemble. A heating element 290 is electrically coupled to a circuit board 292 that transfers power from the base 216 to the kettle 210.

The kettle 210 consists of an inner vessel 242 which is fixedly engaged with a pouring conduit 228 that has a flow-control aperture 296 proximal to the bottom of the kettle and a flow-control pour-spout 214 (FIG. 14) at the top end. The outermost layer of the kettle 210 is a castable-elastomer sheath 238.

Figure 15:
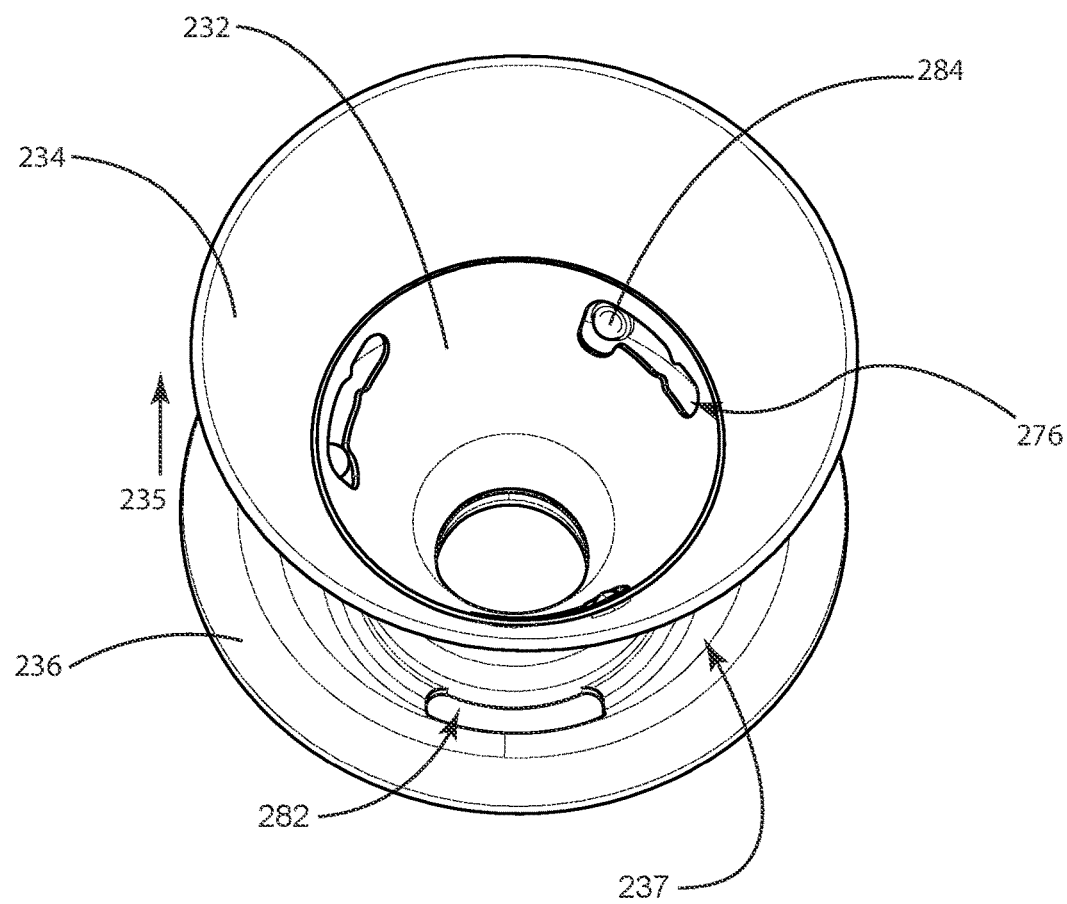
FIG. 15 is a cross-section view of this iteration's funnel filter support, shown expanded.

FIG. 15 shows the funnel filter support 212 from above in its expanded, locked state. The inner frusto-conical section 232 and outer frusto-conical section 234 are locked in place.

The funnel filter support 212 has a base 236 that has an annular channel 237 about its circumference, the channel having at least one through-hole 282. When pouring hot water through a filter held by the funnel filter support 212, any water that drips out of the funnel filter support falls into the annular channel 237 and through-hole 282 to fall into the coffee pot or cup. At least one protrusion 284 extends from the inner wall of the upper frusto-conical section 284. At least one mating L-shaped slot 276 extends through the walls of the inner frusto-conical section 232. One skilled in the art understands how the protrusion 284 mates with the L-shaped slot 276 to hold the paired frusto-conical sections 232/234 assembled in a relatively larger conical filter support 212.

Figure 16:
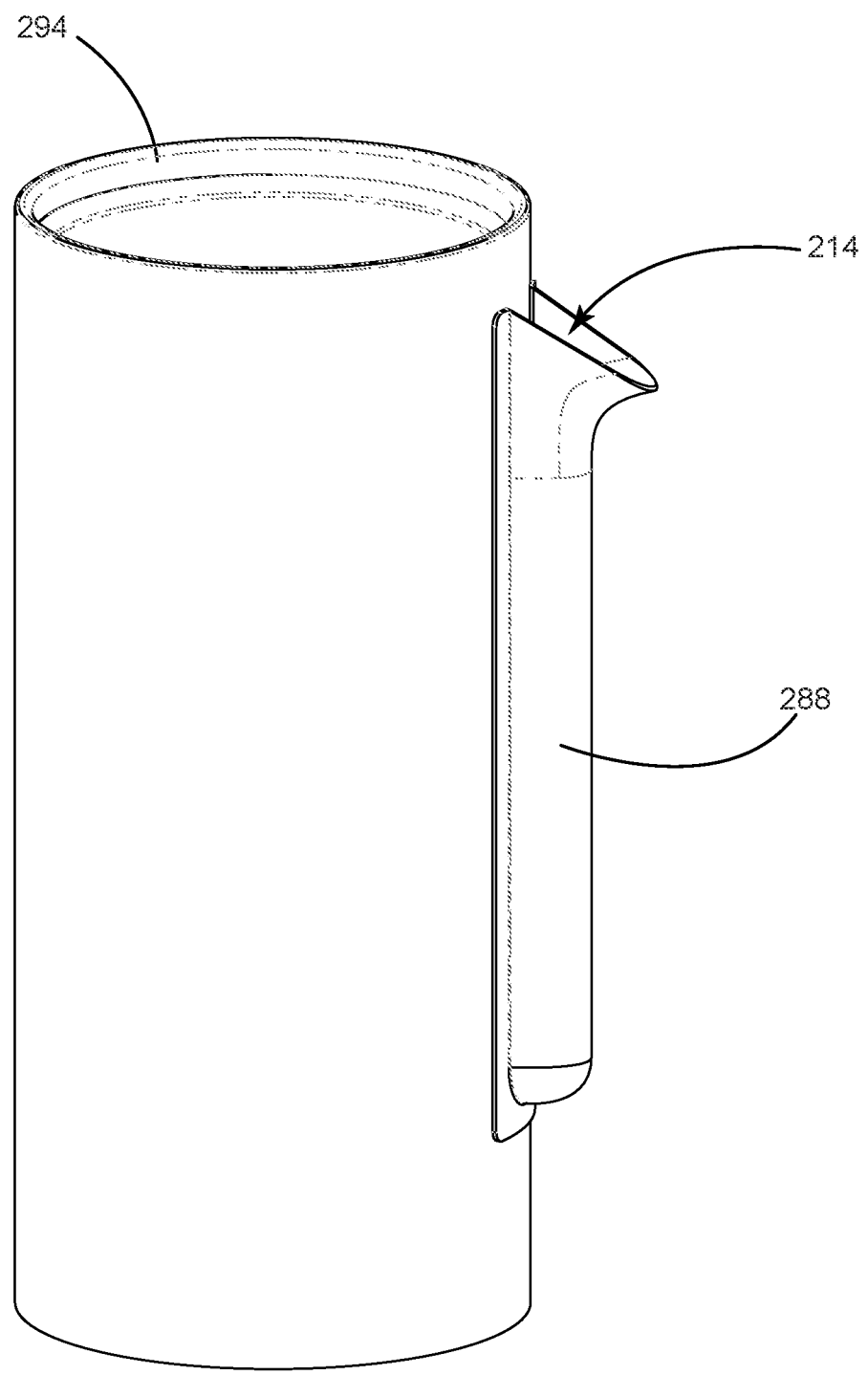
FIG. 16 is a perspective view of the inner vessel of this iteration's kettle.
Figure 17:
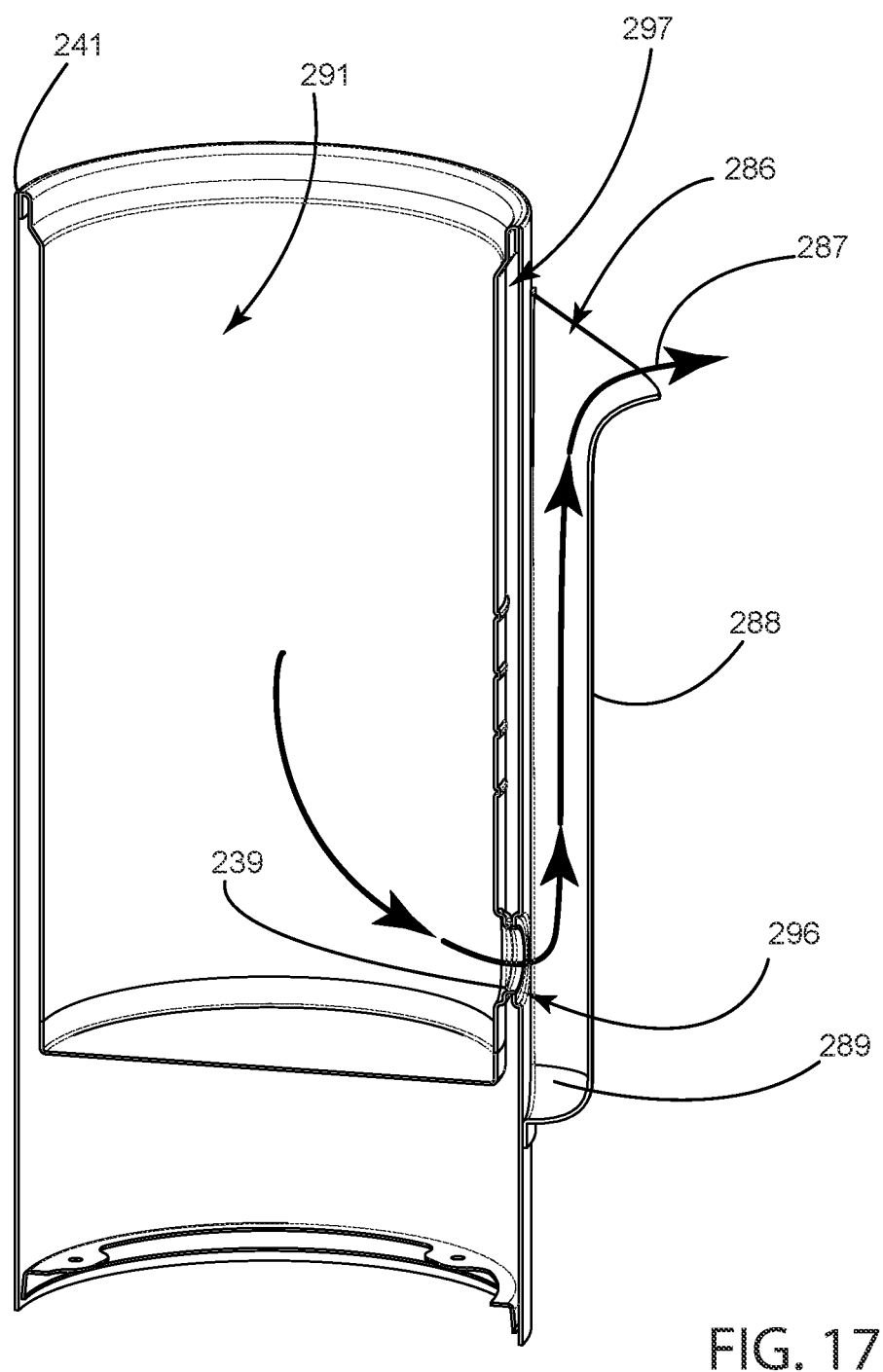
FIG. 17 is perspective, section view showing the flow of liquid through this iteration's inner vessel of the kettle.

FIGS. 16 and 17 show a double-walled inner vessel 242 of the kettle with its integral conduit 288 and pour-spout 214. The angle of the spout opening 286, as well as the proximity of the spout to the inner vessel 242, contribute to even pouring of a steady stream of liquid over coffee grounds in the funnel 212 (FIG. 15). The area of the spout opening 286, relative to the length and diameter of the conduit 288 and the diameter of the flow-control aperture 296, cause liquid to flow in an even, steady stream. The volume of liquid in the kettle produces hydrostatic pressure against the flow-control aperture 296 (FIG. 17) resulting in increased pressure through a relatively flow-control aperture 296 that expands in the conduit 288, where velocity slows, resulting in a steady outward flow through the spout 286. The top rim 294 of the kettle fits a lid (FIG. 13, 226) and is flared to overlap the insulation layers.

FIG. 17 is perspective, section view of the main vessel 242 of the kettle showing the flow of liquid 287 through the flow-control aperture 296 through a 90-degree elbow 289 up the conduit 288 and out of the spout opening 286. The flow-control aperture 296 in some embodiments has an area in cross section that is between 32.23 square millimeters (0.05 square inches) and 51.6 square millimeters (0.08 square inches), while the he conduit 288 in cross section is between 84 square millimeters (0.13 square inches) and 130 square millimeters (0.2 square inches). The ratio of the size of the orifice to the cross sectional area of the spout is between 1:2 and 1:4. The relative size of the flow-control aperture 296 in relation to the cross-sectional area of the conduit 288 provides a flow rate of between 18-25 ml/second. The conduit is formed in part by the portion of the outer surface 297 of the vessel 242. Specifically, the portion of the outer surface 297 that is in fluid communication with the flow path 287 forms a portion of the inner walls of the conduit 288 through which the fluid flows along the flow path 287 at a rate of 18-25 ml/second. The double-walled main vessel 242 has an inner wall 291 and an outer wall 297 that are connected at a seam 241 about the circumference of the top opening of and about a seam 239 about the circumference of the flow-control aperture 296.

The invention claimed is:

1. An apparatus for brewing hot beverages comprising:
   a kettle that is an elongate container having a vertical central axis and a vertical side-wall forming a kettle outer surface; and
   said kettle having a closed bottom end and an open top end; and
   an elongate pouring conduit having a vertical central axis and forming a conduit outer surface; and
   said elongate pouring conduit having a closed bottom end and an open top end; and
   said pouring conduit central axis substantially parallel to the kettle central axis; and
   the conduit outer surface fixedly engaged with the kettle outer surface; and
   an orifice extending through the kettle outer surface into said elongate pouring conduit proximal to said conduit closed bottom end and proximal to said kettle closed bottom end; and
   said ratio of the size of the orifice to the cross-sectional area of the spout is between 1:2 and 1:4; wherein
   flow of a volume of liquid is influenced by a ratio between the cross-sectional area of the orifice and the cross-sectional area of the conduit, resulting in a steady stream when pouring.

2. The apparatus of claim 1 wherein the kettle is a double-walled stainless steel container, having an inner wall and an outer wall; and
   said inner wall fixedly engaged with said outer wall about said kettle open top end; and
   said inner wall fixedly engaged about the circumference of said orifice with said outer wall.

3. The apparatus of claim 1 removably engaged with a collapsible filter support, the filter support comprising:
   a first frusto-conical section having a vertical central axis, an inner surface and an outer surface, an open top end and an open bottom end; and
   said open top end larger than said open bottom end; and
   a protrusion extending from the inner surface of said first frusto-conical section; and
   a second frusto-conical section having a vertical central axis coaxial with said first frusto-conical section vertical axis; and
   said second frusto-conical section having an inner surface and an outer surface, and an open top end, and an open bottom end; and
   said open top end larger than said open bottom end; and
   an L-shaped groove penetrating the second frusto-conical inner surface and outer surface; and
   a base larger than said first frusto-conical open bottom end and fixedly engaged with said second frusto-conical section proximal to said open bottom end; wherein the first frusto-conical section open bottom end is smaller than the second frusto-conical section open top end; and said protrusion is slidably engaged with said L-shaped groove wherein lifting and rotating said first frusto-conical section engages the first frusto-conical section with the second frusto-conical section; and when disengaged do not become distantly separated.

4. The apparatus of claim 1 further comprising:
a cup with a soft covering, in combination configured to fit inside the kettle; and
a semi-circular, snap-on cover for said cup, and
a container with a soft covering, in combination configured to fit inside the cup;
said cup soft covering providing a padding between the cup and the kettle; and
a portion of said container soft covering extending beyond the top of the cup; wherein
the portion of said container soft covering extending beyond the cup, extends past said semi-circular cover and provides a tab for pulling the cup and container out of the kettle and for pulling the container out of the cup.

5. An apparatus for brewing hot beverages comprising:
a kettle that is an elongate cylindrical container having a central axis, a kettle outer surface, a closed bottom end and an open top end; and
an elongate pouring conduit U-shaped in cross section and having a central axis, a conduit outer surface, an open side, a closed bottom end and an open top end; and
said pouring conduit central axis is parallel to the kettle central axis; and
said pouring conduit open top end being flared; and
the open side, fixedly engaged with the kettle outer surface; and
an orifice extending through the kettle outer surface into said elongate pouring conduit proximal to said conduit closed bottom end, and proximal to said kettle closed bottom end; wherein
the orifice controls a flow of a volume of liquid into the conduit, providing a steady stream when pouring.

6. The apparatus of claim 5 wherein the kettle is a double-walled, stainless-steel container, having an inner wall and an outer wall; and
said inner wall fixedly engaged with said outer wall about said kettle open top end; and
said inner wall fixedly engaged about the circumference of said orifice with said outer wall.

7. The apparatus of claim 5 removably engaged with a collapsible filter support, the filter support comprising:
a substantially circular base having a central axis and an annular channel about its circumference, the channel having at least one hole therethrough; and
a first frusto-conical section having a vertical central axis, an inner surface and an outer surface, an open top end and an open bottom end; and
said open top end larger than said open bottom end; and
an L-shaped groove penetrating the first frusto-conical inner surface and outer surface; and
said first frusto-conical section fixedly engaged with said circular base; and
the frusto-conical section vertical central axis substantially collinear with said circular base central axis; and
a second frusto-conical section having a vertical central axis coaxial with said first frusto-conical section vertical axis; and
said second frusto-conical section having an inner surface and an outer surface, and an open top end, and an open bottom end; and
said open top end larger than said open bottom end; and
said second frusto-conical section inner surface proximal to said first frusto-conical section outer surface and having said open bottom end being smaller than said first frusto-conical section open top end; and
a protrusion extending from the inner surface of said second frusto-conical section; wherein
said protrusion is slidably engaged with said L-shaped groove wherein lifting and rotating said second frusto-conical section engages the second frusto-conical section with the first frusto-conical section.

8. An apparatus for brewing hot beverages comprising:
a kettle that is an elongate cylindrical container having a central axis, a kettle outer surface, a closed bottom end and an open top end; and
an elongate cylindrical pouring conduit having a central axis, a conduit outer surface, a closed bottom end and an open top end; and
said cylindrical pouring conduit central axis is parallel to the kettle central axis; and
said cylindrical pouring conduit open top end being flared; and
the cylindrical conduit outer surface fixedly engaged with the kettle outer surface; and
an orifice extending through the kettle outer surface into said elongate pouring conduit proximal to said conduit closed bottom end and proximal to said kettle closed bottom end; wherein
the size of the orifice controls a flow of a volume of liquid into the conduit, providing a steady stream when pouring, and
a cup with a soft covering configured to fit inside the kettle; and
a semi-circular, snap-on cover for said cup, and
a container with a soft covering, in combination configured to fit inside the cup; and
said cup soft covering providing a padding between the cup and the kettle; and
a portion of said container soft covering extending beyond the top of the cup; wherein
the portion of said container soft covering extending beyond the cup, extends past said semi-circular cover and provides a tab for pulling the cup and container out of the kettle and for pulling the container out of the cup, and
the cup being removably engaged with a collapsible filter support, the filter support comprising:
a substantially circular base having a central axis and an annular channel about its circumference, the channel having at least one hole therethrough; and
a first frusto-conical section having a vertical central axis, an inner surface and an outer surface, an open top end and an open bottom end; and
said open top end larger than said open bottom end; and
an L-shaped groove penetrating the first frusto-conical inner surface and outer surface; and
said first frusto-conical section fixedly engaged with said circular base; and
the frusto-conical section vertical central axis substantially collinear with said circular base central axis; and
a second frusto-conical section having a vertical central axis coaxial with said first frusto-conical section vertical axis; and
said second frusto-conical section having an inner surface and an outer surface, and an open top end, and an open bottom end; and
said open top end larger than said open bottom end; and
said second frusto-conical section inner surface proximal to said first frusto-conical section outer surface and having said open bottom end being smaller than said first frusto-conical section open top end; and
a protrusion extending from the inner surface of said second frusto-conical section; wherein said protrusion is slidably engaged with said L-shaped groove wherein lifting and rotating said second frusto-conical section engages the second frusto conical section with the first frusto-conical section.

9. The apparatus of claim 7 wherein the kettle is a double-walled stainless steel container, having an inner wall and an outer wall; and said inner wall is fixedly engaged with said outer wall about said kettle open top end; and said inner wall is fixedly engaged about the circumference of said orifice with said outer wall.

\* \* \* \* \*